United States Patent [19]

Schmidt et al.

[11] 4,436,372
[45] Mar. 13, 1984

[54] ELLIPTICAL MIRROR FOR VEHICULAR USE

[75] Inventors: William P. Schmidt, Rockwood; Franklin D. Hutchinson, New Boston, both of Mich.

[73] Assignee: Mirror Lite Company, Rockwood, Mich.

[21] Appl. No.: 231,662

[22] Filed: Feb. 5, 1981

[51] Int. Cl.³ .............................................. G02B 5/10
[52] U.S. Cl. .................................................. 350/293
[58] Field of Search ............... 350/293, 307, 303, 304; 248/476, 479, 481, 488

[56] References Cited

U.S. PATENT DOCUMENTS

| | | | |
|---|---|---|---|
| 1,561,920 | 11/1925 | Fulgora | 350/293 |
| 1,754,540 | 4/1930 | Behrendt | 350/293 |
| 1,885,153 | 11/1932 | Stewart | 350/293 |
| 1,962,807 | 6/1934 | Clark | 350/293 |
| 2,100,938 | 11/1937 | Brandt | 350/293 |
| 2,257,510 | 9/1941 | Mote | 350/293 |
| 3,316,052 | 4/1967 | Ross | 350/293 |
| 4,023,029 | 5/1977 | Fischer | 350/293 |
| 4,139,269 | 2/1979 | Backenkohler | 350/293 |

Primary Examiner—Jon W. Henry
Attorney, Agent, or Firm—Norbert M. Lisicki

[57] ABSTRACT

A mirror having a convex reflecting surface with a continuous peripheral edge is disclosed. The convex reflecting surface has an apex which extends a predetermined distance H from a plane defined by the peripheral edge. The convex reflecting surface at the continuous peripheral edge has an outer diameter D. The relationship of D/H is in the range of 2.5 to 3.0. The convex reflecting surface is also characterized by a seventh order, sixth degree equation or in the alternative a truncated elliptical surface with a minor axis at 3.72 inches from the origin and a major axis at 4.11 inches from the origin. The elliptical surface being truncated at a distance 0.72 inches from the origin. The mirror is mounted to a disc member with a threaded ball member mounted to the disc member. The threaded member is attached to brackets which are mounted to the vehicle behind the front bumper. The mirror permits the vehicle operator to see in front of, along the side of and behind the vehicle.

27 Claims, 10 Drawing Figures

ELLIPTICAL MIRROR FOR VEHICULAR USE

BACKGROUND OF THE INVENTION

1. Field of the Invention

The present invention relates to the field of mirrors and, in particular, to an adjustable mirror for vehicular use to provide the driver with a wide field of view about his vehicle.

2. Description of the Prior Art

Mirrors have been known to man for many centuries. The mirrors made by the ancient Greeks and Romans were mostly made from polished bronze, but glass mirrors were also known. During the middle ages, a process for backing glass with a thin layer of silver and steel was developed. This enabled the rising middle class people to acquire mirrors.

Today, mirrors are used in a variety of wide ranging applications such as astronomy, space ships, solar devices, vehicles, microscopes, satellite communication devices and medicine. Perhaps the best known application for mirrors, are mirrors for motor vehicles.

Motor vehicles require mirrors in order to provide the driver or operator of the vehicle, the widest possible field of view around his vehicle. This is done for safety purposes since most vehicles, due to structural obstructions, have "blind spots" which prevent the driver from seeing any object which may come near either the rear or sides of the vehicle. For years, the automobile designers have attempted to eliminate these blind spots when designing vehicles. Unfortunately, this objective can never be achieved because of the design of the motor vehicle. Thus, it has been found necessary to mount mirrors in and around the vehicle to enhance the field of view of the driver.

One early attempt to enhance the operator's rear field of view is disclosed in U.S. Pat. No. 2,969,715 to Moseby. Moseby increases the driver's field of view by mounting a very large rear-view mirror to one side of the vehicle. While this increased the field of view, it presented other undesirable structural and safety problems.

Another attempt to overcome this problem is disclosed by Fellmeth, U.S. Pat. No. 2,778,273, issued Jan. 22, 1957. Fellmeth uses a mirror with a flat intermediate portion and a convex edge portion. He mounts the mirror adjacent to the left-hand front door or operator's door so that objects proximate to the side, bottom and rear of the vehicle are reflected in the curved and convex peripheral portion of the mirror. Objects, in the far distance rearwardly, however, are reflected in the medial flat portion. This mirror construction also presents other structural and safety problems.

West in U.S. Pat. No. 2,911,177, issued Nov. 3, 1959, discloses a generally spherical segment-shaped reflecting panel with a flat part insert therein.

King in U.S. Pat. No. 3,104,274; Kalutich in U.S. Pat. No. 3,170,985 and Tobin in U.S. Pat. No. 3,389,952 are further examples of convex rear-view mirrors which are used in combination with larger flat mirrors to enhance the rearward view of the operator of the vehicle. However, all these aforementioned designs have inherent safety and structural problems in that the mirrors generally project a substantial distance outwardly from the vehicle.

Jenkins in U.S. Pat. No. 3,303,396, issued Nov. 10, 1961, discloses a convex rear-view mirror which is mounted inside the vehicle. Jenkins modifies a convex rear-view mirror by gradually increasing the curvature at the ends. This curvature substantially minimizes the distortion of objects. Unfortunately, Jenkins still does not provide a wide enough field of view to eliminate many or most of the blind spots in front of, on the sides and to the rear of the vehicle.

None of the aforementioned prior art mirrors have been successfully employed in school buses to reduce "blind spots" in front of the vehicle. Thus, the National Safety Council has reported 58,000 annual school bus accidents occurring nationally in 1977 and 1978 and approximately 165 fatalities per year. A Kansas Department of Transportation study of these national school bus fatalities pinpoints the contributing factors. From 1975 through 1978, 73 percent of the fatalities were among homeward bound pupils; 60 percent of the pupils were killed by the bus itself; and 47 percent were 5 and 6 years old. These statistics indicate that enhancing the driver's view in front of and around the vehicle could reduce these fatalities.

SUMMARY OF THE INVENTION

The present invention provides a rear-view mirror which substantially enhances the driver's field of view around the vehicle so as to eliminate most blind spots to the driver's view and reduces its outward projection from the vehicle to a minimum.

The mirror according to the present invention includes a convex reflecting surface having a continuous peripheral edge which defines a plane. The convex reflecting surface further having an apex perpendicular to the plane. The apex extends a predetermined distance H from the plane. The convex reflecting surface at the continuous peripheral edge having an outer diameter D. The outer diameter D and the predetermined distance H having a relationship of D/H in the range of 2.5 to 3.0.

The present invention also includes a mirror for use on a motor vehicle to enhance the operator's view in front of the vehicle. The mirror includes a convex reflector surface having a continuous peripheral edge and a convex side extending from the continuous peripheral edge. The continuous peripheral edge further defining a plane. The convex side having an axis perpendicular to the plane. The convex side further being generated by rotating a curved line segment about the axis. The curved line segment being defined by a seventh order, sixth degree equation. The convex reflector surface being mounted onto the motor vehicle such that the vehicle operator views as reflection from the convex reflector surface objects in front of the motor vehicle.

The present invention also provides a mirror for enhancing the operator's view around a motor vehicle. The mirror includes a transparent body having a convex side, a concave side opposite the convex side and a continuous peripheral edge formed between the convex side and the concave side. The convex side and the concave side further defining a truncated elliptical surface. A light reflecting coating is provided on the concave side of the transparent body to reflect light from the convex elliptical surface. In addition, the transparent body is mounted to the motor vehicle such that the vehicle operator views as reflections on the convex side ojbects in front of, to the rear of, and along one side of the motor vehicle.

It is therefore a primary object of the present invention to provide a mirror with a convex reflector surface which, when mounted to the motor vehicle, significantly enhances that the driver's field of view so that the field of view includes in front of, to the rear of, and along one side of the motor vehicle.

It is another object of the invention to provide a mirror with an elliptical reflector surface which is mounted to a motor vehicle to enhance the vehicle operator's view of objects in front of the vehicle.

It is still yet a further object of the present invention to provide a mirror with a convex reflector surface which enhances the driver's field of view so that the driver can see in front, to the rear, and along one side of the motor vehicle with the mirror being located closely adjacent to the motor vehicle.

It is still yet a further object of the present invention to provide a mirror with a convex reflector surface which enhances the driver's field of view which is inexpensive to make, easy to fabricate, and may be easily adapted to many motor vehicle configurations.

A still further object of the present invention is to provide a mirror with a convex reflector surface which enhances the driver's view around the vehicle such that, with convex reflector surfaces disposed on either side on the front end of the motor vehicle, the driver may see in front of, each side of, and to the rear of the motor vehicle.

These and other objects and advantages of this invention will become apparent upon reading the following detailed description and upon reference to the drawings.

DETAILED DESCRIPTION OF THE PREFERRED EMBODIMENT

In the accompanying drawings, a mirror, which is constructed in such a way as to demonstrate the principles of the present invention, is generally designated by the number 100.

Figure 1:
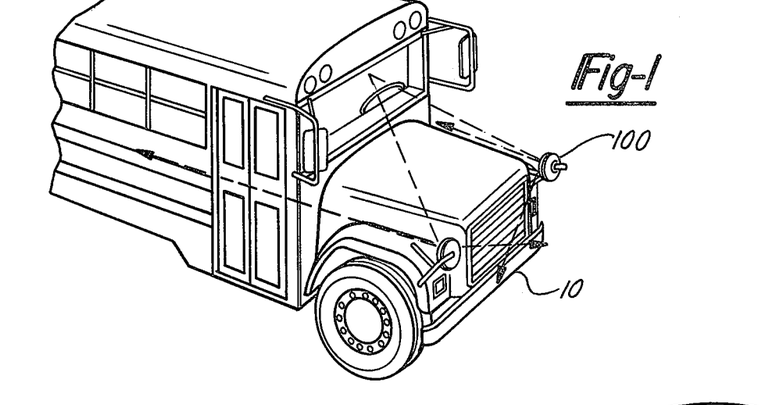
FIG. 1 is a perspective view of the mirror according to my invention on a motor vehicle.
Figure 2:
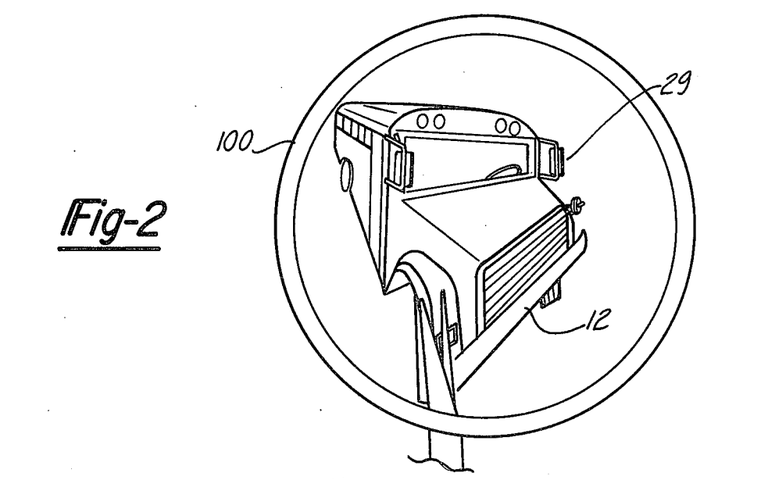
FIG. 2 is a reflected image on a mirror according to my invention mounted on a vehicle as shown in FIG. 1.

FIG. 1 shows the mirror 100 mounted to a motor vehicle 10. In the preferred embodiment, the motor vehicle 10 is a school bus. In the alternative, the motor vehicle is a truck, recreational vehicle, van, station wagon, car, or any other similar vehicle. FIG. 2 shows the image 12 reflected from the reflective surface 29 of the mirror 100 as mounted in FIG. 1, as will be described more fully hereinafter.

Figure 3:
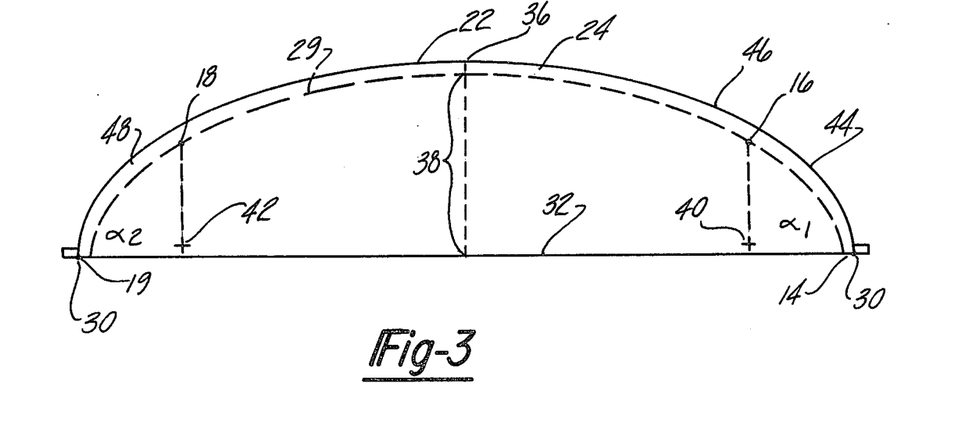
FIG. 3 is a cross-sectional view of the mirror according to my invention.
Figure 5:
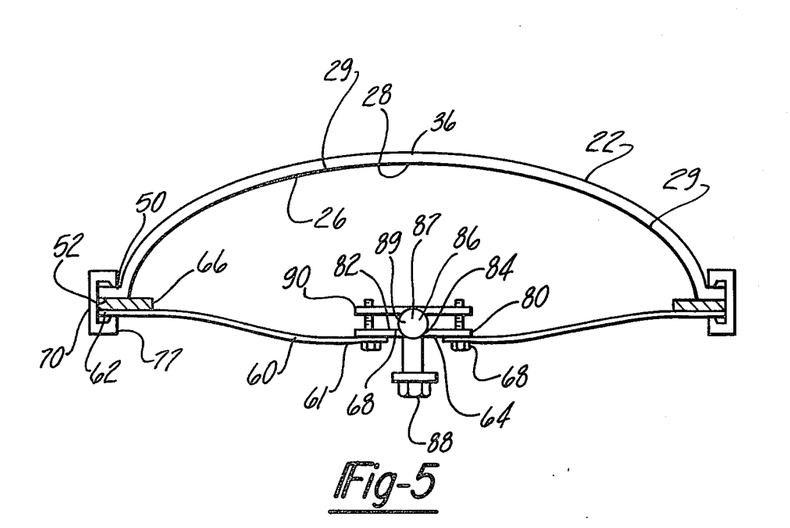
FIG. 5 is another cross sectional view of the mirror including the retainer member.

As best shown in FIGS. 3 and 5, the mirror 100 has a convex surface 24 with a transparent outer surface or body 22 formed thereon. In the preferred embodiment, the transparent outer surface 22 is made of acrylic plastic although other similar transparent materials such as glass can also be used in practicing the invention. The transparent surface is also preferably, by way of non-limiting example, approximately 0.125 inches thick. The mirror 100 also has a curved inner side 26 which is coated with a light reflective coating 28 which is preferably, by way of non-limiting example, approximately 0.7 mils thick to form a convex light reflecting surface 29. In the preferred embodiment, the light reflective coating 28 is formed by aluminum deposition on the concave inner surface 26 or in the alternative, silver plating or any other similar coating well known in the art may be used to accomplish this end. Those skilled in the art will also recognize that the reflective surface 29 need not be protected by a transparent outer surface 22 and that the reflective surface 29 may be the outer surface of a metal body such as polished bronze or any other suitable material well known in the art.

As best shown in FIGS. 3 and 5, the mirror 100 has a circular peripheral edge 30 which defines a diametrical plane 32 having an outer diameter of D, 34. The transparent outer surface 22 has an apex 36 which extends a predetermined distance or H, 38 from the diametrical plane 32. Normally, the distance 38 is perpendicular to the diametrical plane 32. The outer diameter or D and the predetermined distance or H have a relationship of D/H in the range of 2.5 to 3.0 with the preferred D/H equal to 2.7234. The preferred outer diameter or D, by way of non-limiting example, is 8 inches and the predetermined distance or H, by way of non-limiting example, is 2.9375. The predetermined distance or H can, however, vary between 2.67 to 3.20 inches.

Figure 4:
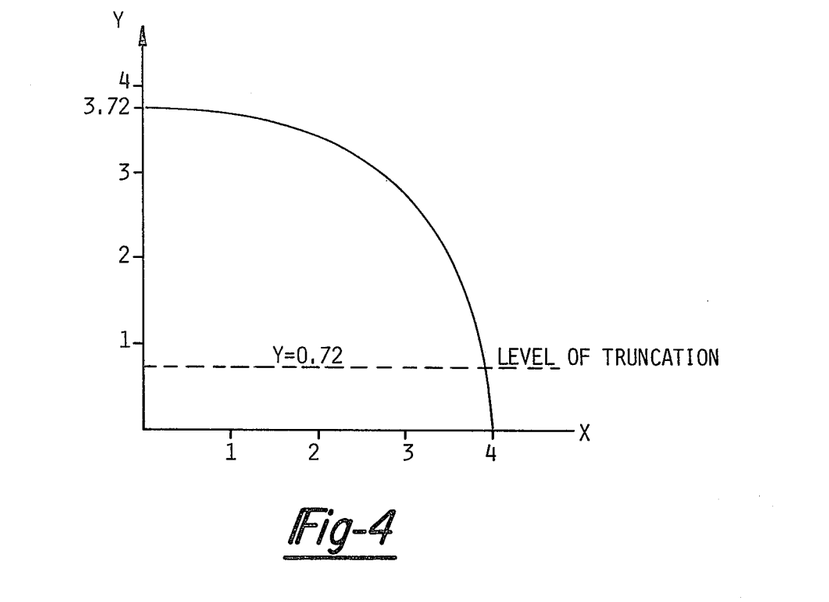
FIG. 4 is a graphical representation of the mirror surface according to the present invention.

The transparent outer surface 22 of the present invention has been described both graphically and mathematically. The convex outer surface 22 may be described mathematically by way of non-limiting example, as the surface generated by the rotation about the predetermined distance or H or Y axis of a curved line segment defined by seventh order, sixth degree equation thusly:

$$Y = 3.72 + 0.06989X - 0.33349X^2 + 0.31664X^3 - 0.20723X^4 + 0.060985X^5 - 0.0067937X^6$$

over the region from X=0 to X=4 where X is defined along the diametrical plane 32. The mirror 100 is further defined by the truncation of the outer surface 22 by a plane perpendicular to the Y axis at approximately 3 inches from the apex 36, as shown in FIG. 4. Thus, the mirror 100 is sometimes referred to as having a 3 inch depth of curvature.

As shown in FIG. 4, the outer surface 22 can also be described, by way of non-limiting example, as a substantially truncated ellipse having an origin at Y=0 and a minor axis at 3.72 inches from the origin and a major axis at 4.11 inches from the origin. The elliptical surface is truncated by a plane at Y=0.72 inches from the origin. The one focal point 40 being located at X=3.0 inches, the other focal point 42 being located equal to −3.0 inches as is well known in the art.

The outer surface 22 may also be described, by way of non-limiting example, graphically as the surface generated by rotation of the Y axis of a curved line segment formed by the faired intersection of two circular line segments in the first quadrant of a rectangular X-Y coordinate system. These two circular segments have centers at X=0.4, Y=0, with radius of 3.63 inches and X=0, Y=−0.8, with radius of 4.52 inches. This surface 22 is truncated for the mirror 100 by a plane passing through the surface of rotation at a level of approximately Y=0.72 inches.

The image characteristics of all mirrors are determined by the laws of geometric optics. These laws are the law of reflection and the law of refraction.

The law of reflection states that are reflected ray lies in the plane of incidence, and the angle of reflection equals the angle of incidence. The law of refraction states that the refracted ray lies in the plane of incidence, and the sine of the angle of refraction bears a constant ratio to the sine of the angle of incidence. These laws are more fully explained in the "Fundamentals of Optics", Third Edition, by Francis A. Jenkins and Harvey E. White in Chapter 1, pages 3-5, which material is incorporated herein by reference.

Another important mirror formula that is used to find the position of any mirror image is:

$$\frac{1}{\text{Object Distance}} + \frac{1}{\text{Image Distance}} = \frac{1}{\text{Focal Length}}$$

In this formula, a convex mirror is given a negative focal length. A positive answer for an image distance by convention means that the image is real, and if the answer is negative, the image is behind the mirror and is virtual.

Finally, the connection between the size of an image and the distance of a real object and the image from the mirror are related as follows:

$$\frac{\text{Size of the Image}}{\text{Size of the Object}} = \frac{\text{Distance of Image}}{\text{Distance of Object}}$$

As is well known in the prior art, in the above formula, the above distances are measured from the mirror reflective surface.

From the foregoing discussion, it is apparent that the light reflective surface 29 is substantially the same as the transparent outer surface 22 because the difference or thickness between the two surfaces is only 0.125 inches. Therefore, what has been described herein for the outer surface will be considered as substantially the same as that for the light reflective surface 29.

Returning back to FIG. 3, the elliptical convex reflector surface 29 of the mirror 100 has its one and other focal points 40, 42 respectively, located on the diametrical plane 32 or the major axis. The reflector surface 29 further includes a first reflector surface segment 44, a second reflector surface segment 46, and a third reflector surface segment 48. The first reflector surface segment 44 extends from point 14 at the edge 30 on the diametrical plane 32 to a point 16 on the reflector surface 29. Point 16 is formed by projecting a line perpendicularly from the plane 32 through the one focal point 40 to the reflector surface 29. The second reflector surface segment 46 extends from the point 16 to a point 18 on the surface 29. Point 18, is formed by projecting a line perpendicularly from the diametrical plane 32 through the other focal point 42 to the reflector surface 29. The third reflector surface segment 48 extends between the point 18 and point 19 which is along the edge 30.

Those skilled in the arts will recognize that a convex surface "reduces" the size of the image thereon. The second reflector surface segment 46 represents that part of a convex elliptical mirror where the incident light rays and the reflected light rays are substantially equal. Thus, the images produced on the second reflector surface are not "reduced" any further since the magnification in the region of the second reflector surface is substantially unity. On the other hand, the first and third reflector surface segments 44, 48 respectively, represent that part of the convex elliptical mirror where the incident and reflected light rays are not equal. Thus, the images formed on the first and third reflector surface segments 44, 48 respectively, produce variable magnification effects. Where the incident light ray path is shorter than the reflected light ray path, the magnification is greater than unity and the image of the object appears bigger than the "real objects" it represents.

However, where the incident light ray path is longer than reflected light ray path, the magnification is less than unity and the image of the object appears smaller than the "real object" it represents. Those skilled in the art will also recognize that the refractive index of the transparent outer body 22 and the air also have an effect on the variable magnification effects produced by the first and third reflector surface segments 44, 48 respectively.

In addition, since the mirror 100 is essentially a truncated elliptical surface, the surface segment 44 at point 14 forms an angle $\alpha_1$ which is less than 90 degrees. Similarly, the third reflector surface segment 48 at point 19 forms an angle $\alpha_2$ which is less than 90 degrees. Therefore, the first reflector surface segment 44 and the third reflector surface segment 48 adjacent to the edge 30 provide a reflective surface which permits reflection of any image thereon to a viewer who is positioned in line with the apex 36 in alignment with the predetermined distance 38. Contrarily, if the reflective surface 29 were purely elliptical, as in prior art devices, the first and third surface segments would be perpendicular to a diametrical plane 32 at edge 30 and thus the perpendicular light rays would not be reflected back to an observer who is similarly positioned in front of the apex 36 of the mirror. Thus, the mirror 100 provides a continuous image 12 on the reflective surface 29 which is distorted in the regions of the first and third surface segments 44, 48 respectively. In spite of this, however, the observer is able to relate to the reduced image formed on the second surface segment 46 and is able to interpret and overcome the distortions to the image occurring near the regions of the first and third reflective surface segments 44, 48 respectively. This is so in the present mirror 100 because the mirror produces no severe astigmatism and therefore no severe distortion of the image produced thereon. Thus, the convex elliptical mirror 100 provides a reflective surface 29 that forms a partially distorted image on that portion of the outer surface 22 that corresponds to the first and third reflector surface segments 44, 48 respectively, because of the variable magnification effects near those segments. On the other hand, a substantially perfect "reduced" image is produced on the second reflective surface segment 46 since very little magnification takes place thereon.

Returning back to FIG. 5, the mirror 100 further has a diametrical mounting flange 50 which extends radially along the diametrical plane 32 at the edge 30. Flange 50 is preferably formed with the same material as the outer surface 22 and is preferably integrally formed with the body 23 of the mirror 100. Adjacent to the mounting flange 50 is a circular disk member 60 which is preferably made of thin sheet metal. The disk member 60 extends across the concave side 26 of the mirror 100. Outer diameter 62 of the disk member 60 is approximately equal to the outer diameter 52 of the flange 50.

A plurality of resilient adhesive strips 66 are applied preferably around the periphery of the disk member 60. The body 23 is then connected to the disk member 60 with the adhesive strips 66 interposed between the flange 50 and disk member 60 by means of a circular flange 70. The circular flange 70 is a U-shaped tubular body which has substantially the same inner diameter 72 as the outer diameter 52, 62 of the members 50, 60 respectively. The flange 70 has an extending portion 74 to secure the body 23 and the disk member 60 together.

The disk member 60 has a central aperture 64 formed in its central portion 61 which has an axis central with the apex 36. Surrounding the central aperture 64 are three equidistantly spaced smaller apertures 68. A stiffener member 80 having a central aperture 84 substantially the same as the central aperture 64 formed in the disk member 60, is mounted adjacent to the central portion 61.

A ball member 86 with a ball head 87 larger than the central apertures 64, 84 respectively, and a stud or threaded longitudinal member 88 extending therefrom is positioned with the spherical portion 89 of the ball member contiguous with the central aperture 84 of stiffener member 80. Surrounding the central aperture 84 are three equidistantly spaced smaller apertures 82 similar in size to the smaller apertures 68 of the disk member 60.

A retainer member 90 similar in construction to the stiffener member 80 is placed on the spherical portion 89 of the ball member 86. Threaded fastener members, well known in the art, are disposed in the smaller apertures 68, 82 and threadably engage suitable apertures 92 in the retainer member 90. Thus, the ball member 86 is held captive by the frictional forces developed by the threaded members pulling the retainer member 90 and the ball member 86 against the stiffener member 80.

The stud 88 is fastened to a plurality of mirror mounts 94 as is conventional in the art. In turn, the mirror mounts 94 are suitably mounted near the front end 11 of the vehicle 10 as shown in FIG. 1.

Figure 6:
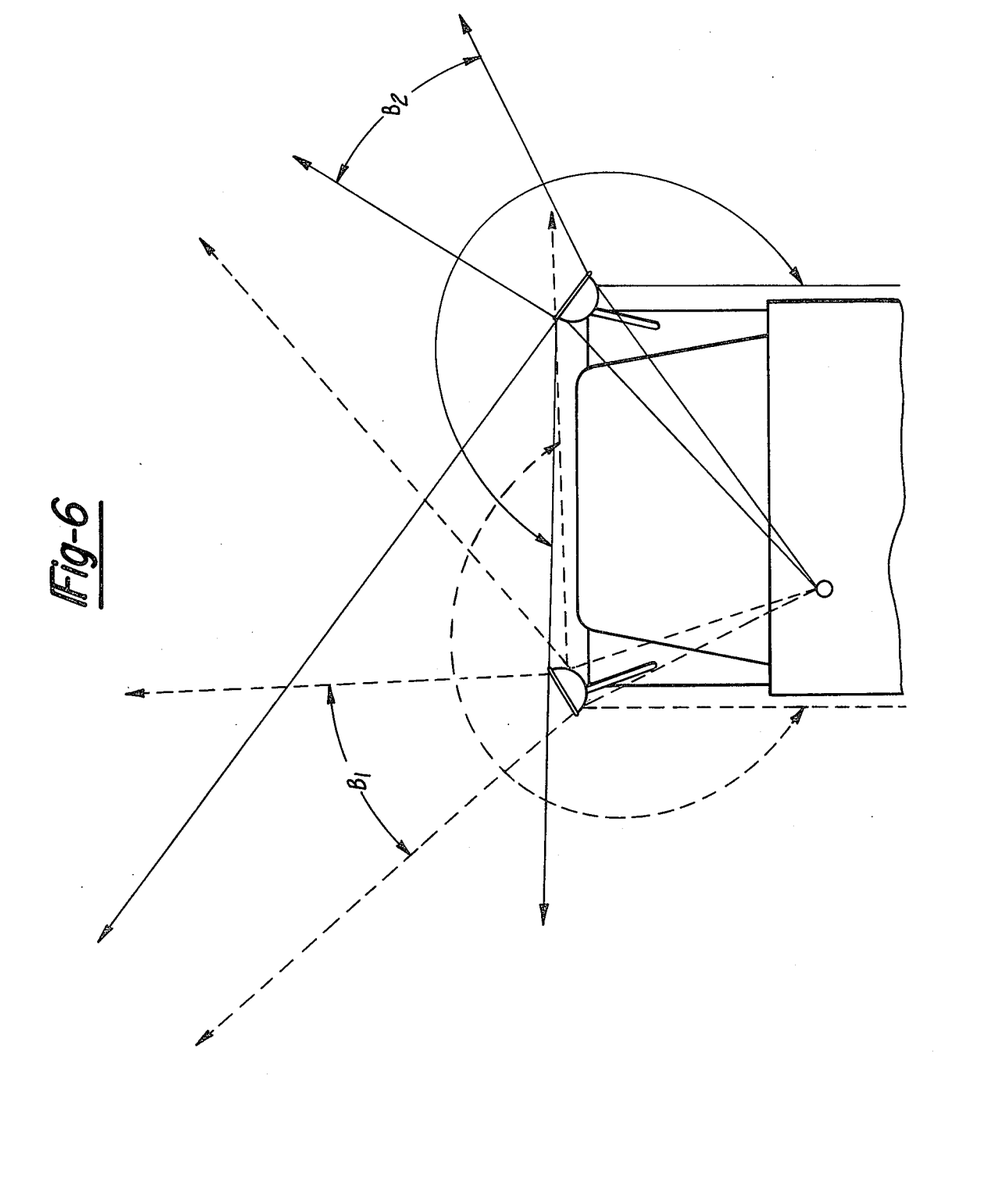
FIG. 6 depicts the field of view of the mirror when positioned on the motor vehicle.
Figure 7:
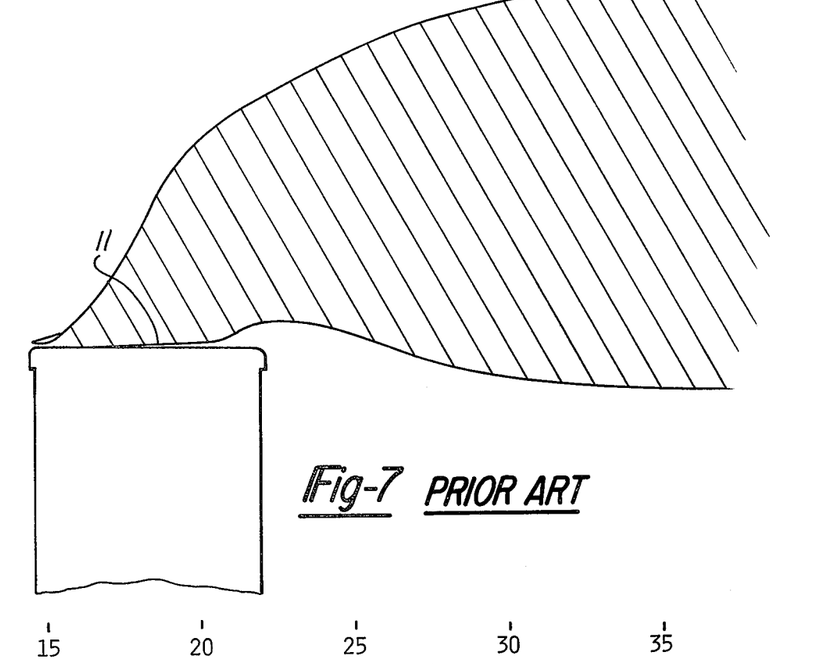
FIGS. 7 and 8 depict the field of view with prior art convex mirrors on a motor vehicle.
Figure 8:
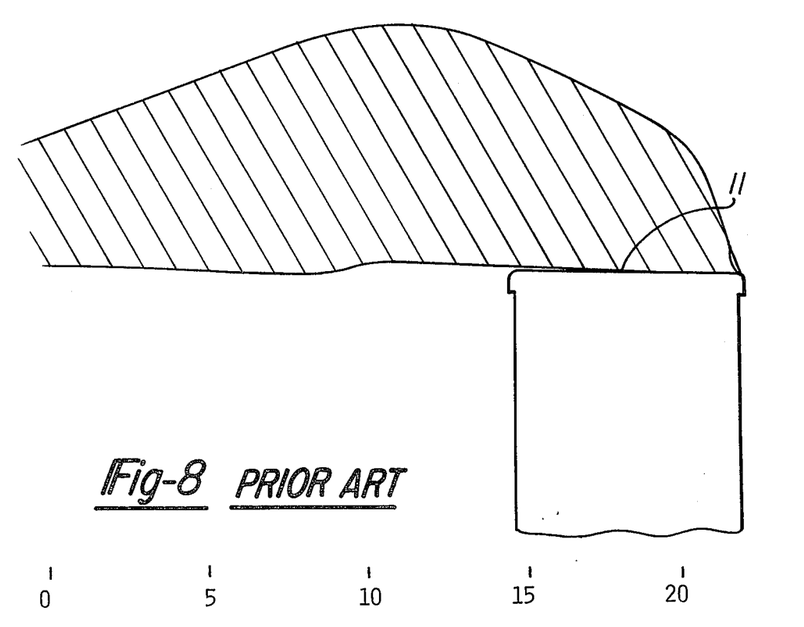
Figure 9:
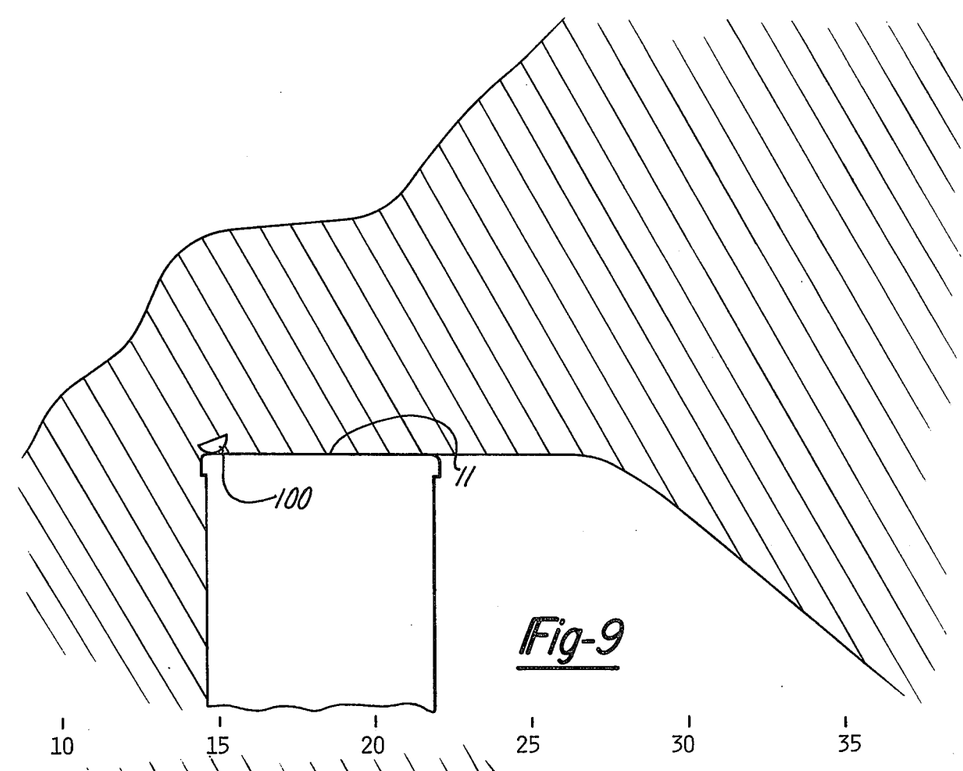
FIGS. 9 and 10 depict the field of view of the mirror according to the present invention on the motor vehicle as shown in FIGS. 7 and 8.
Figure 10:
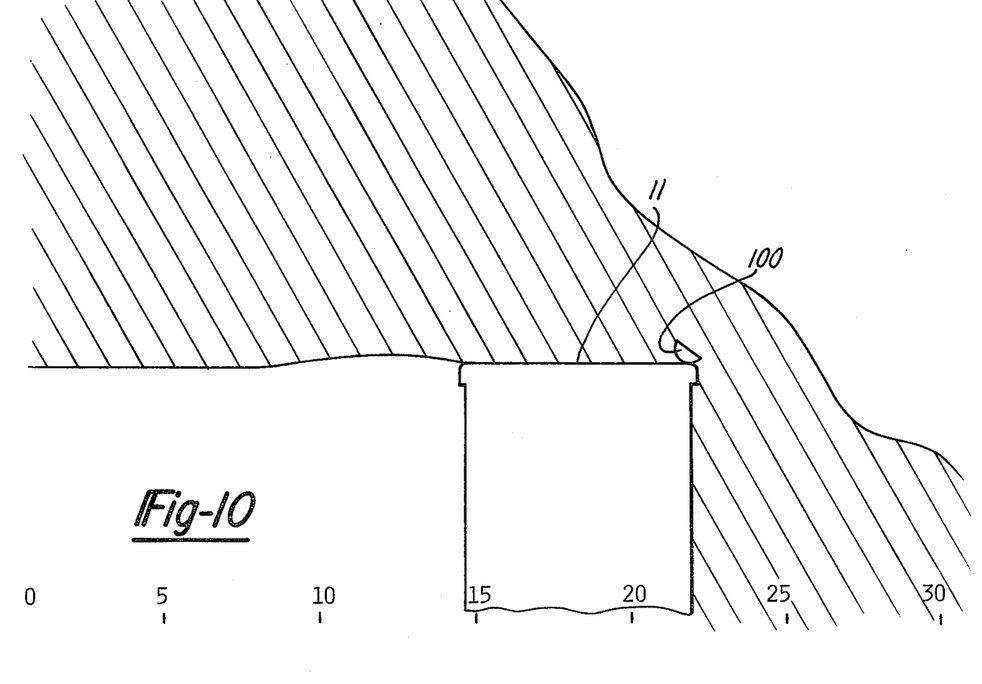

In practicing the invention, it has been found that the apex 36 of mirror 100 is preferably by way of non-limiting example located at least 48 inches from the driver's head. In practicing the invention, it is preferred to align the driver's head in alignment with the predetermined distance 38 when the mirror is used as a pedestrian mirror. A pedestrian mirror is defined as a mirror which is positioned on the vehicle 10 to permit the operator of the vehicle to see passengers near the front end 11 such as in a blind spot of the vehicle 10. This is best illustrated in FIG. 1, where the mirror 100 is positioned near the front bumper 9 of the vehicle 10 to permit the operator to "see" in areas which would normally be obstructed to the operator's view, such as the bumper 9. This is especially important where small school children are concerned since a pair of mirrors as shown in FIG. 1 would permit the operator to "see" in front of the vehicle, especially adjacent to the front bumper. Thus, if a child is bending over in front of the bus, the child would not ordinarily be seen by the operator. In addition, because of the reflective surface 29 providing an image 12 on the total reflective surface 29, the mirror 100 provides a very wide viewing angle as is best illustrated in FIGS. 6, 9 and 10 as compared to the closest known prior art convex shaped mirror shown in FIGS. 7 and 8. Thus, the viewing angle of the prior art mirror for the operator is almost, but less than, 180 degrees.

While the invention has been described in connection with a preferred embodiment, it would be understood that it is not intended to limit the invention to that embodiment. On the contrary, it is intended to cover all alternatives, modifications and equivalents which may be included within the scope of the invention as defined by the appended claims.

What is claimed is:

1. A mirror comprising:
   a convex reflecting surface having a continuous peripheral edge, said continuous peripheral edge defining a plane, said convex reflecting surface further having an apex extending a predetermined distance H from said plane, said convex reflecting surface at said continuous peripheral edge having an outer diameter D, said outer diameter D and said predetermined distance H having a relationship of D/H in the range of 2.5 to 3.00.

2. A mirror comprising:
   a transparent body having a convex side, a concave side opposite said convex side and a continuous peripheral edge formed between said convex and said concave sides, said continuous peripheral edge forming a diametrical plane, said convex side at said peripheral edge having an outer diameter D, said convex side further having an apex, said apex extending perpendicularly a predetermined distance H from said diametrical plane, said outer diameter D and said predetermined distance H having a relationship of D/H in the range of 2.5 to 3.0; and
   a light reflecting coating on said concave side of said transparent body to reflect light from said convex surface.

3. A mirror as claimed in claim 1 further comprising:
   a transparent body mounted on said convex reflecting surface to protect said convex reflecting surface.

4. A mirror as claimed in claim 1 or 2 wherein said outer diameter D is 8 inches.

5. A mirror as claimed in claim 1 or 2 wherein said predetermined distance H varies from 2.67 to 3.20 inches.

6. A mirror as claimed in claim 1 or 2 further comprising an annular flange mounted to said continuous peripheral edge.

7. A mirror comprising:
   a transparent body having a convex side, a concave side opposite said convex side and a continuous peripheral edge formed between said convex and concave sides, said continuous peripheral edge defining a plane, said convex side having an axis perpendicular to said plane, said convex side further being generated by a curved line segment rotated about said axis, said curved line segment defined by a seventh order, sixth degree equation, said seventh order, sixth degree equation having a series of coordinates Y on said axis and a series of coordinates X on said plane, said series of coordinates Y and said series of coordinates X further defined by $Y = 3.72 + 0.6989X - 0.33349X^2 + 0.31664X^3 - 0.20723X^4 + 0.060985X^5 - 0.0067937X^6$; and a light reflecting coating on said concave side of said transparent body to reflect light from said convex side.

8. A mirror as claimed in claim 2 or 7 wherein said transparent body is made of acrylic plastic.

9. A mirror as claimed in claim 2 or 7 wherein said transparent body further having a predetermined thickness of 0.125 inches.

10. A mirror for enhancing the operator's view around a motor vehicle, said mirror comprising:

a transparent body having a convex side, a concave side opposite said convex side and a continuous peripheral edge formed between said convex side and said concave side, said convex side and said concave side defining a truncated elliptical surface, said truncated elliptical surface having a pair of elliptical focal points, said pair of elliptical focal points defining a principal axis extending therethrough and a minor axis perpendicular to said principal axis, said principal axis and said minor axis intersect to form a point of origin, said major axis extending 4.11 inches from said point of origin, said minor axis extending 3.72 inches from said point of origin, said elliptical surface further being truncated on said minor axis at a point 0.72 inches from said origin;

a light reflecting coating on said concave side of said transparent body to reflect light from the convex elliptical surface; and means for mounting said transparent body to said motor vehicle.

11. A mirror for use on a motor vehicle to enhance the operator's view in front of the vehicle, said mirror comprising:

a reflector surface having a continuous peripheral edge and a convex side extending from said continuous peripheral edge, said continuous peripheral edge defining a plane, said convex side having an axis perpendicular to said plane, said convex side further being generated by rotating a curved line segment about said axis, said curved line segment defined by a seventh order, sixth degree equation said seventh order, sixth degree equation having a plurality of magnitudes Y on said axis and a plurality of magnitudes X on said plane, said plurality of magnitudes Y and said plurality of magnitudes X defining a set of coordinates describing said curved line segment, said seventh order, sixth degree equation defined by $Y = 3.72 + 0.6989X - 0.33349X^2 + 0.31664X^3 - 0.20723X^4 + 0.060985X^5 - 0.0067937X^6$;

and means for mounting said convex reflector surface to said motor vehicle.

12. A mirror as claimed in claim 11 further comprising:

a transparent body mounted on said convex reflecting surface to protect said convex reflecting surface.

13. A mirror as claimed in claim 12 wherein said transparent body is made of acrylic plastic.

14. A mirror as claimed in claim 12 wherein said transparent body further having a predetermined thickness of 0.125 inches.

15. A mirror for use on a motor vehicle, said convex mirror comprising:

a convex reflector surface having a continuous radially extending flange and a convex side extending from a continuous radially extending flange, said continuous radially extending edge defining a plane, said convex side defining an outer diameter D at said continuous radially extending flange, said convex side having an apex, said apex extending perpendicularly a predetermined distance H from said plane, said outer diameter D and said predetermined distance H having a relationship of D/H in the range of 2.5 to 3.0; and means for mounting said convex reflector surface to said motor vehicle.

16. A mirror as claimed in claim 15 further comprising a transparent body mounted on said convex reflector surface to protect said convex reflecting surface.

17. A pedestrian mirror for use on a motor vehicle, said pedestrian mirror comprising:

an elliptical reflecting surface having a continuous radially extending flange and a convex side extending from said continuous radially extending flange, said convex side at said radially extending flange defining an outer diameter D, said convex side having an apex, said apex extending perpendicularly from said diametrical plane a predetermined distance H, said outer diameter D and said predetermined distance H having a relationship of D/H in the range of 2.5 to 3.0; and means for mounting said elliptical reflecting surface to said motor vehicle such that the vehicle operator views as image reflected from said elliptical reflecting surface objects in front of said motor vehicle.

18. A mirror as claimed in claim 15 or 17 wherein said outer diameter D is 8 inches.

19. A mirror as claimed in claim 17 further comprising:

a disc member connected to said continuous radially extending flange, a stiffener member mounted to the inner surface of said disc member, said stiffener member and said disc member having portions defining aligned openings;

a ball member mounted in said aligned openings, said ball member having a threaded longitudinal member extending therefrom; and a retainer member mounted to said ball member and connected to said stiffener member and to said disc member.

20. A mirror as claimed in claim 19 further comprising:

means for attaching said threaded longitudinal member to said motor vehicle such that said apex of said elliptical reflecting surface is mounted towards the vehicle operator.

21. A mirror comprising:

a reflecting surface having a continuous peripheral edge and a convex side extending from said continuous peripheral edge, said continuous peripheral edge defining a plane, said convex side having an axis perpendicular to said plane, said convex side further being generated by rotating a curved line segment defined by a seventh order, sixth degree equation, said seventh order, sixth degree equation having a plurality of magnitudes Y on said axis and a plurality of magnitudes X on said plane, said plurality of magnitudes Y and said plurality of magnitudes X defining a set of coordinates describing said curved line segment, said seventh order, sixth degree equation defined by $Y = 3.72 + 0.6989X - 0.33349X^2 + 0.31664X^3 - 0.20723X^4 + 0.060985X^5 - 0.0067937X^6$.

22. A mirror as claimed in claim 7 wherein X varies from 0 to 4.

23. A mirror as claimed in claim 11 wherein X varies from 0 to 4.

24. A mirror as claimed in claim 21 wherein X varies from 0 to 4.

25. A mirror as claimed in claims 22 or 23 wherein said curved line segment is truncated at Y=0.72.

26. A mirror as claimed in claim 24 wherein said curved line segment is truncated at Y=0.72.

27. A mirror comprising:
a reflector surface having a continuous peripheral edge and a convex side extending from said continuous peripheral edge, said continuous periheral edge defining a plane, said convex side having an axis perpendicular to said plane, said convex side further being generated by rotating a faired curved line segment about said axis, said faired curved line segment defined by a first circular segment and a second circular segment, said first circular segment having a first series of coodinates Y on said axis and a first series of coordinates X on said plane, said second circular segment having a series of coordinates Y on said axis and a second series of coordinates X on said plane, said faired curved line segment formed by the fared intersection of said first and second circular segments in the first quadrant of said X and Y coordinate system, said first circular segment further defined by a first center at X=0.4 inches and Y=0 inches and a first radius from said first center of 3.63 inches, said second circular segment further defined by a second center at X=0 inches and Y=0.8 inches with a second radius from said second center of 4.52 inches, said faired curved line segment tuincated at Y=0.72 inches.

* * * * *